March 8, 1932.  W. L. MORGAN  1,848,190
SOUNDPROOF AND HEAT INSULATING GLASS
Filed Aug. 23, 1930
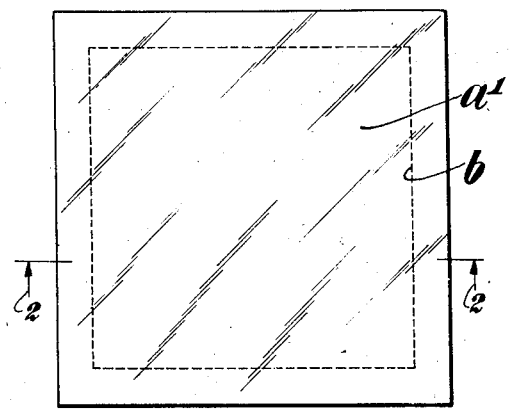
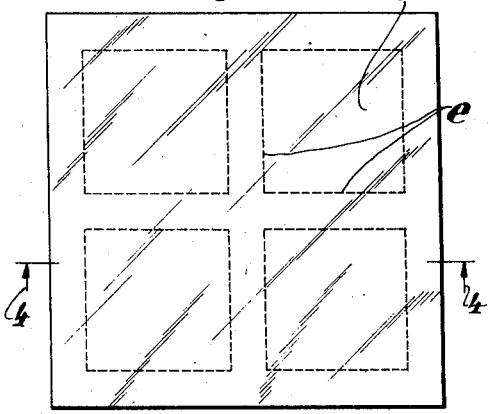
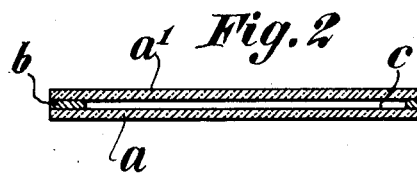
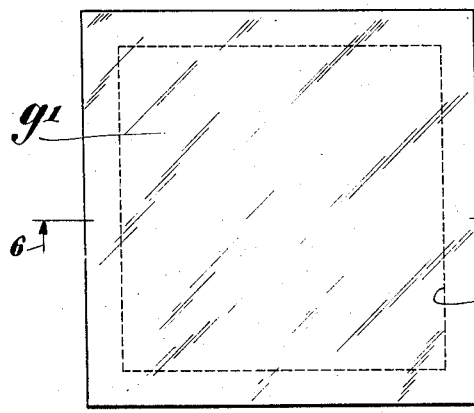
INVENTOR
Willard L. Morgan,
BY
HIS ATTORNEYS Patented Mar. 8, 1932

1,848,190

UNITED STATES PATENT OFFICE

WILLARD L. MORGAN, OF NUTLEY, NEW JERSEY, ASSIGNOR, BY MESNE ASSIGNMENTS, TO LIBBEY-OWENS-FORD GLASS COMPANY

SOUNDPROOF AND HEAT INSULATING GLASS

Application filed August 23, 1930. Serial No. 477,335.

The present invention relates to laminated glass structures and embodies, more specifically, a laminated or composite glass having the properties of being highly sound proof and heat insulating.

The invention further relates to sound proof structures consisting of composite glass wherein a plurality of laminations of glass are provided, between certain of which laminations air cells or pockets are formed. The sound resisting, as well as heat insulating character of these air pockets will be readily appreciated as the invention is described in further detail hereinafter and the wide use to which these composite glass structures may be put will partially be revealed as the invention is further described.

An object of the invention, accordingly, is to provide a composite glass structure in which is incorporated means to provide heat insulating as well as sound proof characteristics.

A further object of the invention is to provide a composite glass structure of the above character wherein an air pocket is formed between the laminations of the glass structure.

Further objects, not specifically enumerated above, will be apparent as the invention is described in further detail in connection with the accompanying drawings, wherein:

Figure 1 is a plan view of a composite glass structure constructed in accordance with the present invention.

Figure 2 is a view in section, taken on line 2—2 of Figure 1, and looking in the direction of the arrows.

Figure 3 is a plan view of a modified form of the invention, the composite glass structure embodying a plurality of air pockets between the laminations thereof.

Figure 4 is a view in section taken on line 4—4 of Figure 3 and looking in the direction of the arrows.

Figure 5 is a plan view showing a composite glass structure of a further modified form, this form embodying an air pocket between each of a plurality of laminated sections.

Figure 6 is a view in section, taken on line 6—6 of Figure 5, and looking in the direction of the arrows.

Referring to the above drawings, particularly to the structure shown in Figures 1 and 2, a composite glass structure is shown as formed of two glass laminations $a$ and $a'$, in the form shown these laminations being formed of rectangular glass plates.

Between these plates and adjacent the perimeters thereof, is a spacing member $b$ which is preferably formed by stenciling from a sheet of celluloid, thus forming a hollow pocket $c$ between the plates $a$ and $a'$, the extremities of which are defined by the celluloid stencil $b$.

It is preferred that the glass be coated with gelatine, preferably by spraying, a protecting metal stencil being placed on the glass to prevent the gelatine coating from being applied to the surface of the glass against which the celluloid stencil is not applied. The celluloid is stenciled out to the desired shape, that is, of the outline of the gelatine coating on the glass and is lightly sprayed with known solvents to soften the surface thereof. The celluloid is then placed between two similarly formed glass plates and heat and pressure applied thereto. In applying pressure to these elements great care is exercised to prevent pressure from being applied to any portion of the glass plates under which there is no celluloid.

It has been found that cardboard stencils or other forms of padding are quite effective in this respect, being placed over the plates to overlie the celluloid stencils. Care must be exercised to form the cardboard or padding stencils in exact conformity to the celluloid stencil inasmuch as pressure on the glass over the area of the pocket frequently causes breakage. Accuracy in the formation of the padding stencils is very necessary inasmuch as it results in securing the laminations of glass to the celluloid at the edges thereof.

If desired, a partial vacuum may be formed within the pocket by laying the unbonded sandwich of elements above described on a warm surface such as a press platen, removing the top glass and inserting a small quantity of a volatile celluloid solvent, such as acetone.

This is placed in the center of the sandwich on the lower glass and the upper glass is then applied, leaving a small aperture to permit vapors to escape. The solvent evaporates under the influence of the heat and carries the air out with it from between the glass plates. In a short time the upper glass may be slid over the celluloid into its proper position for lamination, thus shutting off the interior which is filled with the vapor of the solvent. The sandwich is then placed in a heated press and the lamination secured between the elements by the use of heat and pressure, care being exercised to use stenciled paddings, as already described, in order to prevent breakage. Upon cooling the glass, after pressing, this solvent vapor condenses to liquid and thus produces a partial vacuum which is slowly increased by the fact that the solvent is absorbed by the side walls of the celluloid.

In the construction shown in Figures 3 and 4, plates $a$ and $a'$ are shown as being spaced by a celluloid stencil $d$, the outer portion of which is similar to the stencil $b$, but having intersecting portions $e$. These portions form a plurality of air pockets $f$, the composite structure being formed in a manner similar to that described in connection with the device shown in Figures 1 and 2. In certain instances, for example, refrigerator doors, etc., it is desirable to provide a composite structure of great strength. For that purpose, the composite structure of Figures 1 and 2 is modified by substituting composite plates for the plates $a$ and $a'$, the stencil $b$ being similar to that of Figures 1 and 2. These composite plates are formed of inner and outer plates $g$ and $g'$, respectively, layers of celluloid $h$ securing the plates together in a well known fashion.

While the structures shown in Figures 1, 2, 3, and 4 are not shock proof in the sense that they cannot be broken, the cementing of the two panes of glass by border strips in the manner described above, produces a structure which is abnormally resistant to shocks. Furthermore, unless a very severe blow is received by the structure, the larger fragments remain held in position by the celluloid.

While the invention has been described with specific reference to the structures shown in the accompanying drawings, it is not to be limited, save as defined in the appended claims.

I claim as my invention:

1. The method of forming a composite glass structure comprising applying a celluloid stencil to a glass plate, placing a quantity of a volatile celluloid solvent upon the plate within the stencil, applying a second glass plate over the stencil, permitting the vapors to escape, completely closing the space defined by the stencil, and securing the second plate to the stencil.

2. The method of forming a composite glass structure comprising applying a celluloid stencil to a glass plate, placing a quantity of a volatile celluloid solvent upon the plate within the stencil, applying heat to the plate, applying a second glass plate over the stencil, permitting the vapors to escape, completely closing the space defined by the stencil, and securing the second plate to the stencil.

3. The method of forming a composite glass structure comprising applying a celluloid stencil to a glass plate, placing a quantity of a volatile celluloid solvent upon the plate within the stencil, applying heat to the plate, applying a second glass plate over the stencil, permitting the vapors to escape, completely closing the space defined by the stencil, and applying pressure to the second plate only at points overlying the stencil.

This specification signed this 15th day of August A. D. 1930.

WILLARD L. MORGAN.